Jan. 2, 1934.  G. BLACKSTOCK  1,942,198
AUTOMATIC ROLLER CLUTCH TRANSMISSION
Filed July 9, 1931   2 Sheets-Sheet 1

INVENTOR.
G. BLACKSTOCK.
BY
ATTORNEYS.

Jan. 2, 1934.  G. BLACKSTOCK  1,942,198
AUTOMATIC ROLLER CLUTCH TRANSMISSION
Filed July 9, 1931  2 Sheets-Sheet 2

INVENTOR
G. BLACKSTOCK
BY
ATTORNEYS.

Patented Jan. 2, 1934

1,942,198

UNITED STATES PATENT OFFICE 1,942,198

AUTOMATIC ROLLER CLUTCH TRANSMISSION

Gibbs Blackstock, Toronto, Ontario, Canada

Application July 9, 1931. Serial No. 549,749

12 Claims. (Cl. 192—45)

My invention relates to improvements in automatic roller clutch transmission, and the primary object of this invention is to provide an automatic roller clutch controlled by a floating torque transmitting member in a manner similar to that disclosed in my copending application Serial No. 428,195, filed February 13th, 1930, and further objects are to provide a transmission incorporating such a clutch that will change gear in substantially automatic manner, and generally as will appear below to provide for smooth and efficient working.

Incorporated in the clutch control is a floating torque transmitting member which has an arc of freedom with respect to an adjacent member and can thus move between two angular positions, the driving position and the release position.

Means are provided for locking the floating member in the driving position with the clutch rollers operative for driving and for unlocking the floating member to allow the advance of the driving part to carry it to the released position, this motion being used to throw the rollers into the inoperative condition.

The clutch is re-set in the driving condition by retarding the driving part when the floating member is caught on synchronization and returned to the driving position to become locked there.

In the form in which the clutch is here described the driving part is an internal annular flange or drum, two sets of rollers, driving and catch rollers, being interposed between the driving part and the floating member which is provided with two sets of oppositely facing wedging surfaces with which the driving and catch rollers respectively coact.

The floating member is connected to the adjacent driven member by a system of resilient pressure members (preferably spring pressed weights) in one and engaging cams in the other. A pocket is formed at one end of each cam in which the corresponding pressure member enters to lock the parts in the driving position and out of which they are forced by overload to unlock them. Means are also provided such as striker blocks carried on the driven part by which as the floating member moves to the released position the drive rollers are struck off their coacting wedging surfaces to release the clutch.

It is an important feature that this occurs after the pressure members have yielded and when the floating member is advancing freely and so at a time when there is no load on the clutch. When the driving part is retarded to the speed of the other parts the catch rollers catch and return the floating member to the driving position, the pressure members entering the pockets. Optionally the striker blocks can be arranged so that they strike the catch rollers "off" as the parts go into the drive position in which case the clutch will free wheel until the power is again applied, or they may leave the catch rollers "on", in which case the clutch has a bi-directional lock. In the latter case the curved cam pocket acts as a shock absorber.

The clutch is especially intended as a direct drive in a motor vehicle transmission in combination with a lower gear train having a free wheel element in it, but its applicability is not to be limited to this use, even without other gear trains it can be used as an overload release.

Figure 1:
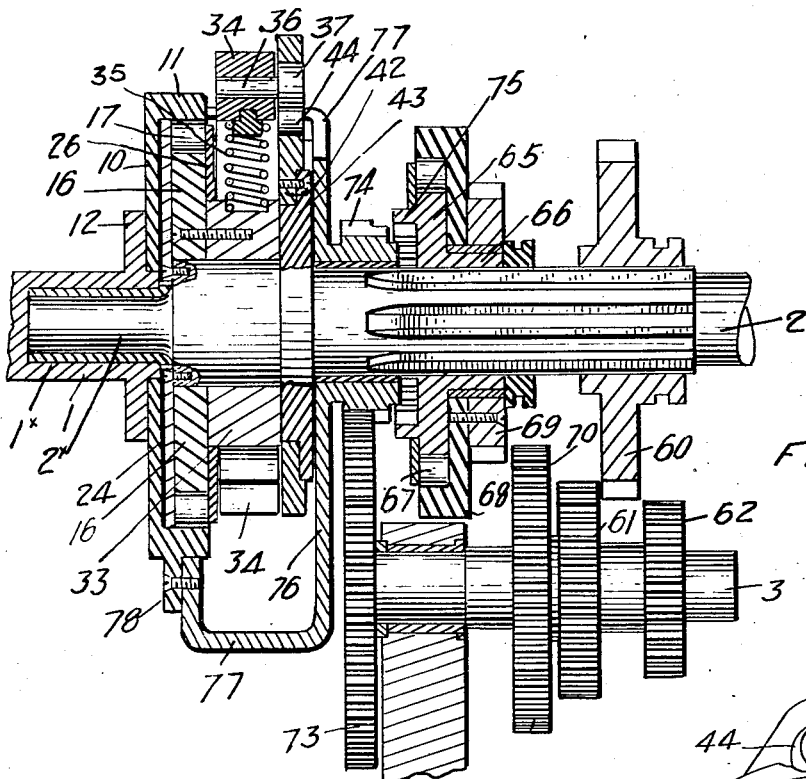
Fig. 1 shows a sectional view of the clutch with the parts in the driving position and free wheeling and also indicates a way in which it can be incorporated in a transmission.

"Forward" and "backward" are used of rotation with and against the arrows which show the normal direction. The front is to the left of Fig. 1.

In the drawings like characters of reference indicate corresponding parts in each figure.

I will first describe the clutch mechanism and its operation per se and then describe its application to a transmission gear train.

1 indicates a drive shaft having a flange 12 and an end longitudinal bearing recess $1^x$. 10 is a web secured to the flange 12 and provided with an annular concentric flange or drum 11 forming the main driving member.

2 is the driven shaft having a reduced portion $2^x$ freely mounted in the bearing recess $1^x$ and having a flange 43 spaced from the reduced end $2^x$ of the driven shaft 2 providing space upon the driven shaft for mounting the clutch parts between said flange and the web 10 of the driving member 11.

42 is the main driven member secured to the flange 43 of the driven shaft 2 and together with the flange forming an adjacent power transmitting member adjacent the floating member comprising the parts 16, 33 and 33×. The driven member 42 is roughly triangular in form, as will be seen particularly on referring to Fig. 3, having a cam orifice in each angle portion of the triangle, each orifice comprising two circular overlapping portions 44 and 45, the angular portion on the line of overlap being cut away to form a flat cam 44× on one side of which the orifice portion 44 forms a relatively deep pocket 44⁰, and on the opposite side of which the orifice portion 45 forms a shallow pocket 45⁰. 44× is concentric with the shaft 2.

24 is a disc secured as though integral with the end of the main portion of the driven shaft and extending concentrically around the portion 2×, being provided adjacent its periphery with projections 25 hereinafter referred to as striker blocks.

Interposed between the flange 43 and the disc 24 and mounted freely upon the driven shaft 2 is a floating member comprising the disc portion 16 and the hub portion 33 secured together or formed integral.

The disc portion 16 of the floating member is provided with peripheral recesses 16× having inclined ends 16⁰ and 17⁰ forming wedging surfaces wedging the rollers 17 and 18 alternately against the inner periphery of the main driving member 11 as hereinafter described. The striker blocks 25 overhang the periphery of the disc portion 16 of the floating member, a striker block being interposed between each pair of rollers 17 and 18 so as to alternately engage the rollers 17 and 18 when the floating member is rocked on the driven shaft 2.

The hub portion 33 of the floating member is provided with radial arms 33× on which are pivotally mounted weight arms 34 as indicated at 31. 36 are studs extending from the weight arms adjacent their free ends and provided with wheels 37 coacting alternately with the pockets 44⁰ and 45⁰. The arms 34 are spring pressed outward by the springs 35 extending between such arms and the hub 33.

26 is a disc secured to the portion 16 of the floating member and provided with flange portions 27 bent over to retain a weak spring pressure device such as indicated at 28 for pressing the rollers 17 and 18 towards the wedging surfaces 17⁰ and 16⁰.

Figure 2:
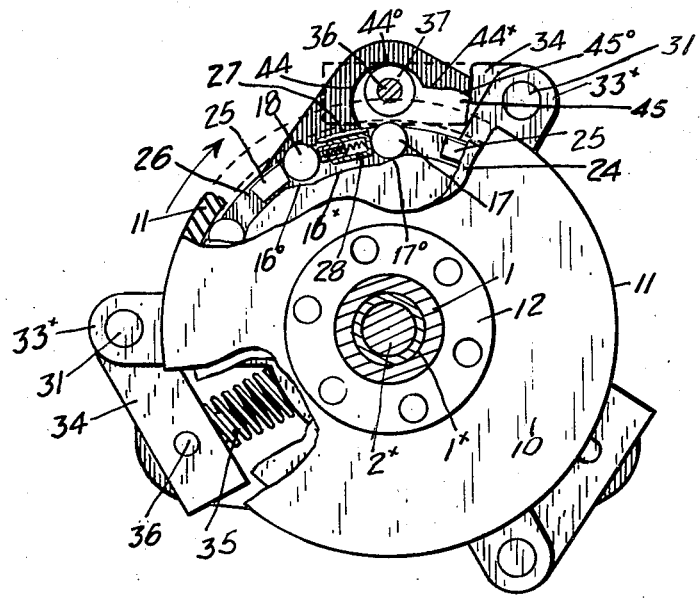
Fig. 2 is a front view of the clutch alone, the parts being in the corresponding position to Fig. 1 and with some parts cut away to show the essential details.

The cam pockets 44⁰ in which the driving studs and wheels 37 rest, as illustrated in Fig. 2, lock the floating member in the driving position. When free wheeling the drum or annular flange 11 travels more slowly in the direction of the arrow than the other parts, the drive rollers 17 slipping easily, the catch rollers 18 being held off.

When power is applied the drive rollers 17 grip and power is transmitted through the driving flange 11, rollers 17, wedging surfaces 17⁰ of the floating member, arms 33× of the floating member, weights 34, and studs 36, the wheels 37 thereof engaging the pockets 44⁰ of the driven member to rotate the driven shaft 2 to which the driven member 42 is secured as long as the wheels 37 remain in the pockets 44⁰.

The release of the clutch takes place in the following manner.

Figures 3, 6:
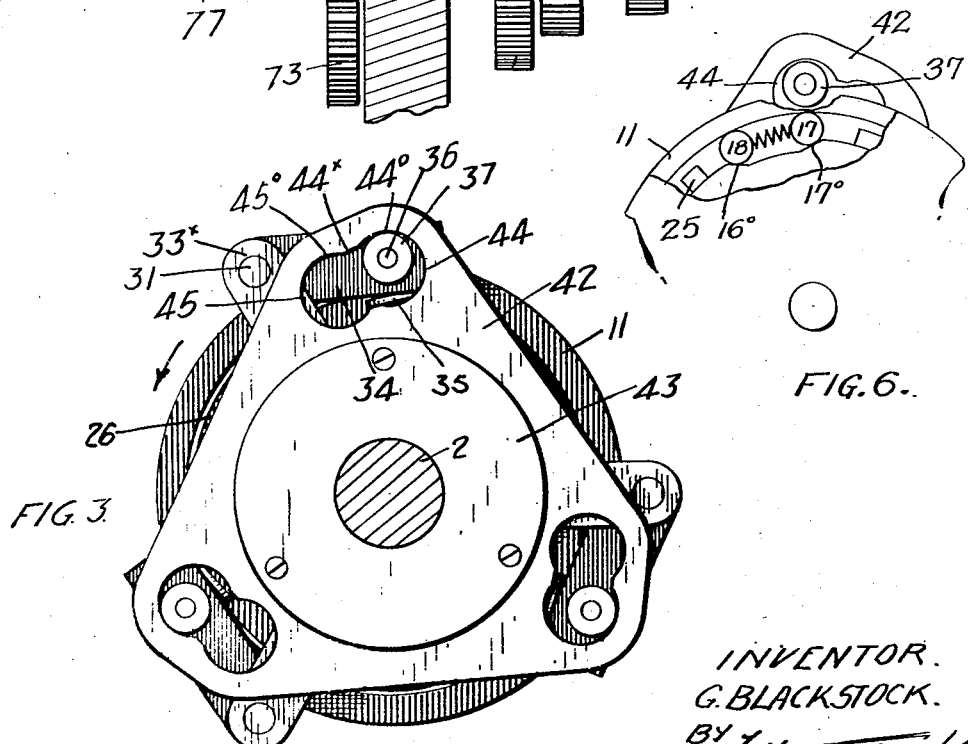
Fig. 3 is a rear view of the clutch alone.
Fig. 6 is an alternative construction showing an arrangement in which the clutch rollers do not allow free wheeling.

When the load is great enough and by the consequent retarding of the driven member the driving wheels 37 are forced radially inward and forward in the direction of the arrow in Figures 2 and 3 against spring and centrifugal force out of the pockets 44⁰, the advance of the driving flange 11 then carrying the floating member engaged by the rollers 17 above described forward, the driving studs 36 and wheels 37 going over the cams 44× into the shallow pockets 45.

As the wheel 37 moves out of the drive pocket 44⁰ the advance of the floating member 16 with respect to the striker block 25 adjacent to the catch roller 18 lets such catch roller 18 return to the wedging surface 16⁰.

As the wheel 37 enters the release pocket 45⁰ the roller 17 is carried against the striker block 25 adjacent thereto and is struck off the wedge 17⁰.

Figure 4:
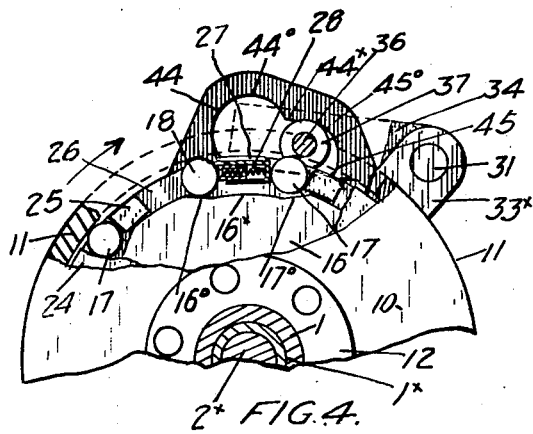
Fig. 4 is a similar view to Fig. 2 showing the clutch rollers etc. in the released position.

The clutch is now released. The parts then assume the position illustrated in Fig. 4 and the main driver 11 can advance independently, the drive rollers 17 being "off" and the catch rollers 18 slipping. The wheel 37 settles in the shallow pocket 45⁰ to hold the parts in position.

Note that the drive rollers are struck off when there is no load on them, the floating member being unlocked and advanced freely.

The clutch returns to the driving condition when the drive shaft is retarded to the speed of the floating and driven members.

On synchronization the catch rollers 18 lock the floating member to the drive shaft (see Fig. 4) carrying the floating parts including the wheel 37 back while the driven parts including the cam orifice pockets 45⁰ and 44⁰ continue to advance thereby carrying the wheel 37 back from the pocket 45⁰ into the pocket 44⁰ so that the parts again assume their driving position as in Fig. 2.

As the driving wheel 37 leaves the release pocket 45⁰ the drive rollers 17 are carried out of engagement with their adjacent striker blocks 25 and re-engage the wedges 17⁰ and as it enters the drive pocket 44⁰ the catch rollers 18 are struck off the inclined wedging surfaces 16⁰. The clutch now free wheels until power is again applied.

The best adjustment of striker blocks is such that the rollers are struck off just as the roller 37 is entering one of the pockets. If the roller 18 is struck off while the driving stud is moved over the spur formed at the entrance to the pocket 44⁰ then the outward force due to weights and springs gives the wedging member a thrust to the left (see Fig. 2) which tends to push the wedging surface 16⁰ away from the roller at the time and makes for a clean and smooth release. Similar considerations hold for the release of the drive rollers 17, though this is not so apparent owing to the smaller size of the pocket 45.

Strictly speaking the floating member is carried through most of its arc by the advancing or the retardation of the driving member 11 and then through a small part at the end by its momentum and by the action of the pockets, after the rollers have been struck off.

I will now describe my clutch in connection with a transmission.

The transmission here shown amounts substantially to an ordinary three speed sliding gear set with two additions. There is a plain free wheel roller clutch in the second gear train, the automatic clutch forming an additional direct drive.

When the free wheel second gear is meshed the driving becomes automatic between it and high. The change up is effected by throttling for a second, the free wheel clutch free wheels and the automatic one goes to the driving condition, it free wheels until the throttle is reopened and then takes the drive. The change down is effected by overload release of the automatic clutch, generally produced by deliberate opening of the throttle, the engine races and then the other clutch takes the drive.

For low gear the sliding gear 60 meshes with 61 on the countershaft 3 provided with a gear 73 driven from the gear 74 connected to the main drive member 11, and for reverse with an idler driven from 62. For second the sliding member 66 moves to the right the freely mounted gear 69 meshing with 70. Between the gear 69 and the splined hub 66 there may be any approved form of free wheel clutch, such as the simple roller clutch illustrated. The drum 68 of the free wheel clutch is secured to the gear 69. 67 is a roller and the wedge member 65 is integral with the sliding hub 66. For a positive direct drive the sliding member 66 moves to the left, when the internal teeth 75 on it mesh with the ends of the reduced drive gear teeth 74. This reduced drive gear 74 is secured to the drive shaft in the following manner, designed to facilitate the use of the positive direct drive and keep down the dimensions of the machine. 76 is a disc integral with the gear 74 and having strong bent over arms 77 secured to flanges 78 on the drum 11, the arms having sufficient spread not to foul the weights 34. The gear 74 is thus freely mounted on the driven shaft. This arrangement enables the countershaft to be much nearer the main shaft than if the gear 74 were on the flange 12.

When the car is brought to rest the driver may set the gears in neutral while the engine clutch is open. When this engages again overload will be applied to the automatic clutch, if it happens to be engaged, and it will release. There then being no lower gear drive to engage, the engine may be left running freely. To facilitate starting the engine by hand or pushing the car about when it is at rest it is advisable to have some means for holding the engine clutch pedal down, such as any simple form of latch.

If it is desired that the automatic clutch should have a bi-directional lock, the striker blocks 25 and catch wedging surfaces 16° (Fig. 2) are so spaced that the catch rollers 18 are not struck off. This is illustrated in Fig. 6 where it is seen that the catch roller 18 does not come near the block 25, and so is not struck off the wedge cam 16° when the parts are in the drive condition. Since both sets of rollers are "on", torque can be transmitted in either direction. The curved contour of the pocket 44 has a shock absorbing effect as the clutch goes into engagement.

Figure 5:
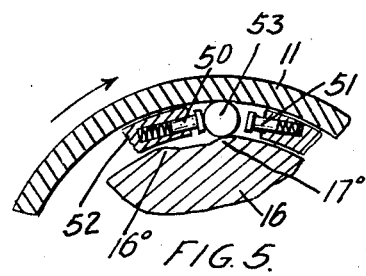
Fig. 5 is a fragmentary detail view showing how only one set of rollers can be used.

In Fig. 5 I have shown an alternative structure. In this figure one set of rollers can perform both the catch and drive functions. The blocks 52 and the spring pressed studs 50 and 51 replace the striker blocks 25 and spring pressure device 28. The roller 53 is in the drive position. When the floating member advances to the release position the stud 51 first strikes the roller off the drive wedging surface 17° and then presses it on the catch wedging surface 16°. When the floating member moves back to the drive position the reverse action takes place.

The transmission shown provides for braking power from the engine through direct drive (teeth 74 and 75) and low but not through second. As transmissions with more than three gear ratios are commonly known it is obvious that another intermediate gear train of the ordinary kind like the low gear one 60, 61 can be provided for the purpose of using the engine as a brake.

The arrangement of clutch parts shown in Figs. 1 and 2 appears to be preferable to others, in carrying the simpler part, the drum, on the shaft most liable to torsional vibration, but from the description that has been given it is thought to be now apparent that the parts may be variously re-arranged as long as the motion of the floating member is available for actuating the rollers.

Similarly with the whole transmission, the preferred simpler construction is shown, but anyone familiar with the subject can see that many re-arrangements, simplifications and additions can be made. Helical constant mesh gears can obviously be used and the gears variously re-arranged.

One re-arrangement is worthy of mention. If the first and second gears are carried on the same sliding piece the change from first to second (automatic system) is made by a straight motion of the hand lever without "crossing the H", a great convenience in a car which must be started in first as this change can be made almost in one motion with the other just as the car begins to move.

Although the automatic clutch has been described with reference to simple cylindrical rollers I think it can now be seen that the term "rollers" need not be restricted to cylinders, as there are a number of shapes which the objects can have and still act in the same manner, the most obvious of which are spheres and cones.

What I claim as my invention is:

1. In a roller clutch transmission device, the combination with main driving and driven parts, of a floating torque member connected with an adjacent one of the main parts and adapted to move through an arc with respect to the same between a driving and a release position, clutch rollers and coacting parts between the floating member and the other main part adapted to assume alternately a drive transmitting and a released condition, operating mechanism controlled by relative motion of the floating member and adjacent main part and adapted to maintain the rollers in the drive transmitting condition while the floating member is in the driving position and to release them as it moves toward the release position, means for locking the floating member in the driving position to transmit power and for unlocking it to allow the advance of the main driving part to carry it freely to the release position.

2. In a roller clutch transmission device, the combination with main driving and driven parts, a floating torque member connected with an adjacent one of the main parts and adapted to move through an arc with respect to the same between a driving and a release position, roller clutch parts or clutch rollers and coacting parts between the floating member and the other main part adapted to assume alternately a drive transmitting and a released condition, and roller operating mechanism controlled by motion of the floating member in the said arc adapted to maintain the clutch parts or rollers in the released condition while the floating member is in the release position and to set them in the drive transmitting condition as it moves toward the driving position, of a catch device between the floating member and the main part other than that with which it is connected adapted to return the floating member to the driving position as the main driving part on retardation synchronizes with the driven part.

3. In a roller clutch transmission device, the combination with main driving and driven parts and an interposed floating torque member connected to an adjacent one of them and adapted to have limited angular freedom with respect to it between a drive and a release position, of roller clutch parts between the floating member and the other main part, an operating mechanism controlled by relative motion of the floating member and adjacent part adapted to set the roller clutch parts in drive transmitting condition as it moves toward the drive position and to release them as it moves toward the release position, means actuated on synchronization and retardation of the driving part to move the floating member to the driving position, and a locking device adapted to lock the floating member in the driving position by centrifugal force and to unlock it as overload counteracts such force to allow the advance of the driving part to carry it freely to the release position.

4. In a roller clutch transmission device, the combination with main driving and driven parts and an interposed floating torque member connected to an adjacent one of them and adapted to have limited angular freedom with respect to it between a drive and a release position, of roller clutch parts between the floating member and the other main part, an operating mechanism controlled by relative motion of the floating member and adjacent part adapted to set the roller clutch parts in drive transmitting condition as it moves toward the drive position and to release them as it moves toward the release position, means actuated on synchronization and retardation of the driving part to move the floating member to the driving position, and a locking device between the floating member and adjacent main part including a cam on one provided with a pocket and a resilient pressure member on the other adapted to enter the pocket to lock the floating member in the drive position and to be forced out of it by overload to allow the floating member to be carried freely to the release position.

5. In a roller clutch transmission device, the combination with main driving and driven parts and an interposed floating torque member connected to an adjacent one of them and adapted to have limited angular freedom with respect to it between a drive and a release position, of roller clutch parts between the floating member and the other main part, an operating mechanism controlled by relative motion of the floating member and adjacent part adapted to set the roller clutch parts in drive transmitting condition as it moves toward the drive position and to release them as it moves toward the release position, means actuated on synchronization and retardation of the driving part to move the floating member to the driving position, and a locking device between the floating member and adjacent main part including a cam on one provided with a deep and a shallow pocket, and a resilient pressure member on the other adapted to enter the shallow pocket to hold the floating member very yieldingly in the release position, and to enter the deep pocket to lock it strongly in the drive position to unlock it therefrom by overload and to allow its free motion between the said positions.

6. In a roller clutch transmission device, the combination with main driving and driven parts and an interposed floating torque member connected to an adjacent one of them and adapted to have limited angular freedom with respect to it between a drive and a release position, of roller clutch parts between the floating member and the other main part, an operating mechanism controlled by relative motion of the floating member and adjacent part adapted to set the roller clutch parts in drive transmitting condition as it moves toward the drive position and to release them as it moves toward the release position, means actuated on synchronization and retardation of the driving part to move the floating member to the driving position, and a locking device between the floating member and adjacent main part including cams on one provided with pockets and spring pressed centrifugal pressure members on the other adapted to enter the pockets to lock the floating member in the drive position and to be forced out by overload to allow the floating member to be carried freely to the release position.

7. A roller clutch transmission device comprising roller clutching parts including a drum, a member with wedging faces and clutch rollers between adapted to assume alternately a drive transmitting and a release condition, radially movable weights connected in torque transmitting manner with the above parts and adapted to be carried subject to centrifugal force and to inward force due to load, and an interconnecting mechanism actuated by inward motion of the weights due to overload to disengage the rollers from the drive transmitting condition.

8. In a roller clutch device, clutching parts including clutch rollers and coacting faces between which they work, and a control device in torque transmitting connection with the clutching parts and comprising floating and adjacent torque transmitting members, the floating member adapted to have some angular freedom with respect to the adjacent member between a first and a second position, means for locking it in the first position to prevent applied torque from carrying it to the second position and means for unlocking it to allow it to be carried freely to the second position, and mechanism actuated by such motion of the floating member to disengage the rollers from torque transmitting contact with the coacting faces.

9. In a roller clutch device, main parts, clutch rollers and coacting faces and a control device, all connected to transmit torque in a predetermined direction between the main parts, the said control device comprising floating and adjacent torque members connected to have some mutual angular freedom between a first and a second position, operating mechanism controlled by mutual displacement of the floating and adjacent members adapted to disengage the rollers from torque transmitting contact with the coacting faces as the floating member moves toward the second position and to reset them in such contact as it moves toward the first position, means for locking the floating member in the first position to prevent its being carried to the second position by action of the applied torque and for unlocking it to allow it to be carried freely to the second position, and a catch device actuated by relative motion of the main parts in a direction opposite to that by the above mentioned torque transmission to carry the floating member to the first position.

10. A roller clutch transmission device comprising main driving and driven parts and a floating torque member connected with an adjacent one of such parts and adapted to move through an arc with respect thereto between a drive and a release position, an annular face on the other of said main parts, a set of wedging cams on the floating member and clutch rollers coacting with such faces and cams, a locking device connecting the floating and adjacent members adapted to lock the former in the drive position and to unlock it to allow the advance of the main driving part to carry it toward the release position, abutments carried with the said adjacent main part and adjusted to allow the rollers to contact with the cams when the floating member is in the drive position but to push them off the cams as it approaches the release position, and yielding means for holding rollers in contact with cams.

11. A roller clutch transmission device comprising main driving and driven parts and a floating torque member connected with an adjacent main part and adapted to move through an arc with respect thereto between a drive and a release position, means for locking it in the drive position and unlocking it, an annular face on the other main part, coacting rollers and a set of driving wedge cams inclined so as to coact in carrying the floating member toward the release position by advance of the main driving part when the same is unlocked and an oppositely inclined second set of wedge cams both sets of cams being on the floating member, abutments carried with the said adjacent part and adjusted to hold rollers off the drive wedge cams when the floating member is in the release position and off the second set of cams when it is in the drive position, and yielding means for holding rollers in contact with cams.

12. In a roller clutch transmission device, the combination with main driving and driven parts and a floating torque member connected to an adjacent main part and adapted to have motion across an arc with respect thereto between a drive and a release position, and releasable roller clutch parts between the floating member and the other main part, and means for locking the floating member in the drive position and for unlocking it to allow the advance of the main driving part to carry it toward the release position, of clutch releasing mechanism controlled by relative motion of the floating member toward the release position and adjusted to release the clutch parts before it reaches the release position, and spring means for moving the floating member on to the release position.

GIBBS BLACKSTOCK.